United States Patent

Schnaibel et al.

[11] Patent Number: 6,018,948
[45] Date of Patent: Feb. 1, 2000

[54] METHOD AND DEVICE FOR LOWERING A BOOST PRESSURE OF A TURBOCHARGER

[75] Inventors: Eberhard Schnaibel, Hemmingen; Ulrich Steinbrenner, Stuttgart; Wolfgang Wagner, Korntal-Münchingen; Hong Zhang, Regensburg, all of Germany

[73] Assignee: Robert Bosch GmbH, Stuttgart, Germany

[21] Appl. No.: 08/776,344

[22] PCT Filed: Feb. 22, 1996

[86] PCT No.: PCT/DE96/00272

§ 371 Date: Mar. 25, 1997

§ 102(e) Date: Mar. 25, 1997

[87] PCT Pub. No.: WO96/37377

PCT Pub. Date: Nov. 28, 1996

[30] Foreign Application Priority Data

May 26, 1995 [DE] Germany .......................... 195 19 381

[51] Int. Cl.[7] ....................................................... F02B 37/12
[52] U.S. Cl. ............................................................ 60/602
[58] Field of Search .............................. 60/600, 601, 602, 60/603; 123/564

[56] References Cited

U.S. PATENT DOCUMENTS

| | | | |
|---|---|---|---|
| 5,083,434 | 1/1992 | Dahlgren et al. | 60/602 |
| 5,186,081 | 2/1993 | Richardson | 60/600 |
| 5,213,178 | 5/1993 | Polidan et al. | |
| 5,365,908 | 11/1994 | Takii et al. | |

FOREIGN PATENT DOCUMENTS

| | | |
|---|---|---|
| 3224254 | 1/1993 | Germany . |
| 4424160 | 1/1995 | Germany . |

*Primary Examiner*—Michael Koczo
*Attorney, Agent, or Firm*—Kenyon & Kenyon

[57] ABSTRACT

A device for lowering boost pressure as a function of a defined setpoint engine torque (MMS) when the setpoint engine torque (MMS) or a setpoint engine performance quantity associated therewith is smaller than a corresponding engine performance quantity (MMFA) that is specified without boost pressure intervention. Thus, all performance quantities which require a specific engine torque are able to be controlled in open or closed loop by lowering boost pressure.

8 Claims, 3 Drawing Sheets

METHOD AND DEVICE FOR LOWERING A BOOST PRESSURE OF A TURBOCHARGER

BACKGROUND INFORMATION

The present invention relates to a device for lowering the boost pressure of a turbocharger in an internal combustion engine having a turbocharger in order to reduce engine torque.

A device of this kind is disclosed by the German Patent 32 24 254 C2. Under this prior art, the boost pressure is lowered and/or cylinders are selectively suppressed to limit engine torque or to reduce it until no more tire slip occurs, regardless of how heavily the driver of a vehicle is pressing down on the accelerator. The engine torque is controlled here in open-loop as a function of the detected tire slip. Under this prior art, the engine torque is controlled in open-loop as a function of only one single variable that characterizes vehicle performance, namely tire slip.

SUMMARY OF THE INVENTION

The object of the present invention is to disclose a device of the type mentioned at the outset, which will be able to control the engine torque in open or closed loop as a function of a plurality of influencing parameters.

To achieve this objective, the device according to the present invention lowers the boost pressure as a function of a defined setpoint engine torque when the setpoint engine torque or a setpoint engine performance quantity associated therewith is smaller than a corresponding engine performance quantity that is specified without intervening in the boost pressure. Accordingly, it is also possible to promote engine torque reduction, as well as the lowering of boost pressure, through cylinder suppression and/or ignition timing intervention.

Because a specified setpoint engine torque is retrieved as a controlled or directly controlled variable for engine torque, a plurality of variables that influence engine or vehicle performance can be considered. Thus, for example, the setpoint engine torque can be derived from a traction control system (TCS) or represent a controlled or directly controlled variable, which results from the requirement for a rotational speed or velocity limitation or for a gear speed change intervention.

DETAILED DESCRIPTION OF THE DRAWINGS

Figure 1:
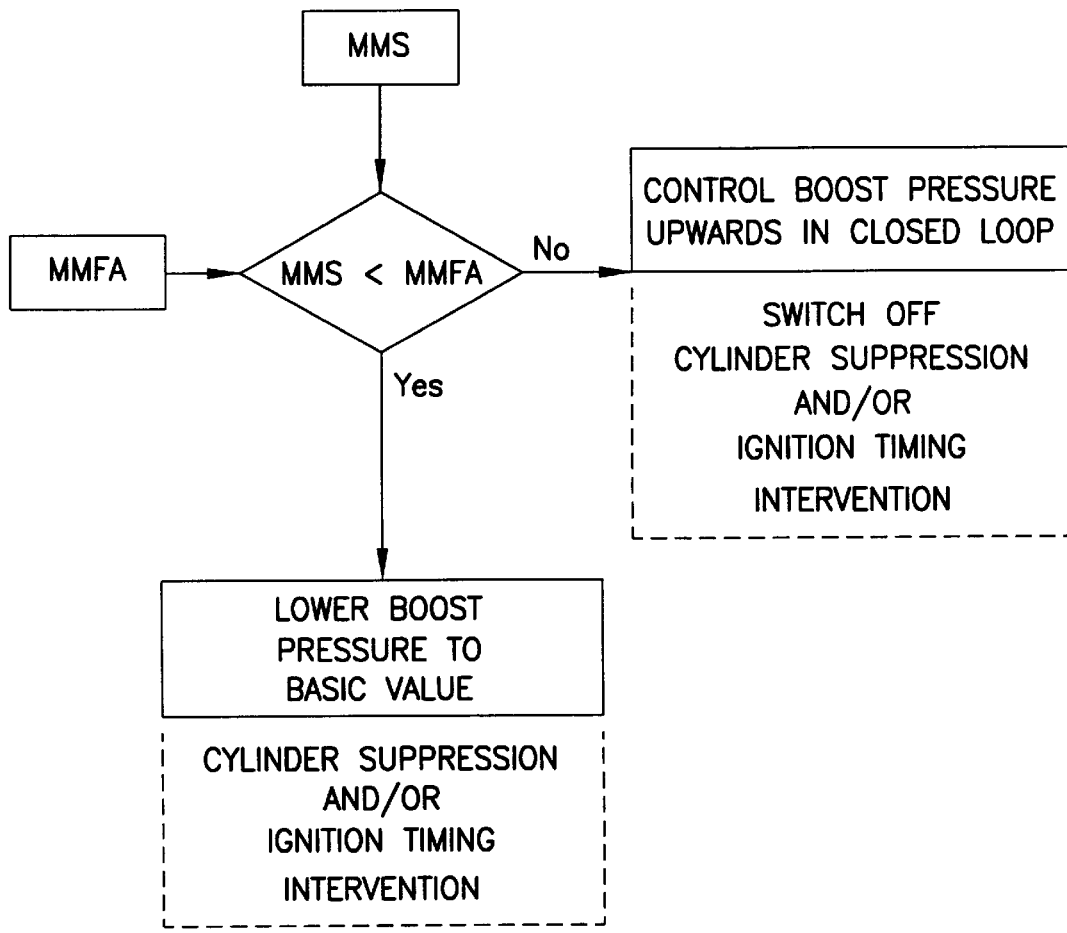
FIG. 1 shows a flow chart of a first exemplary embodiment of the present invention.
Figure 2:
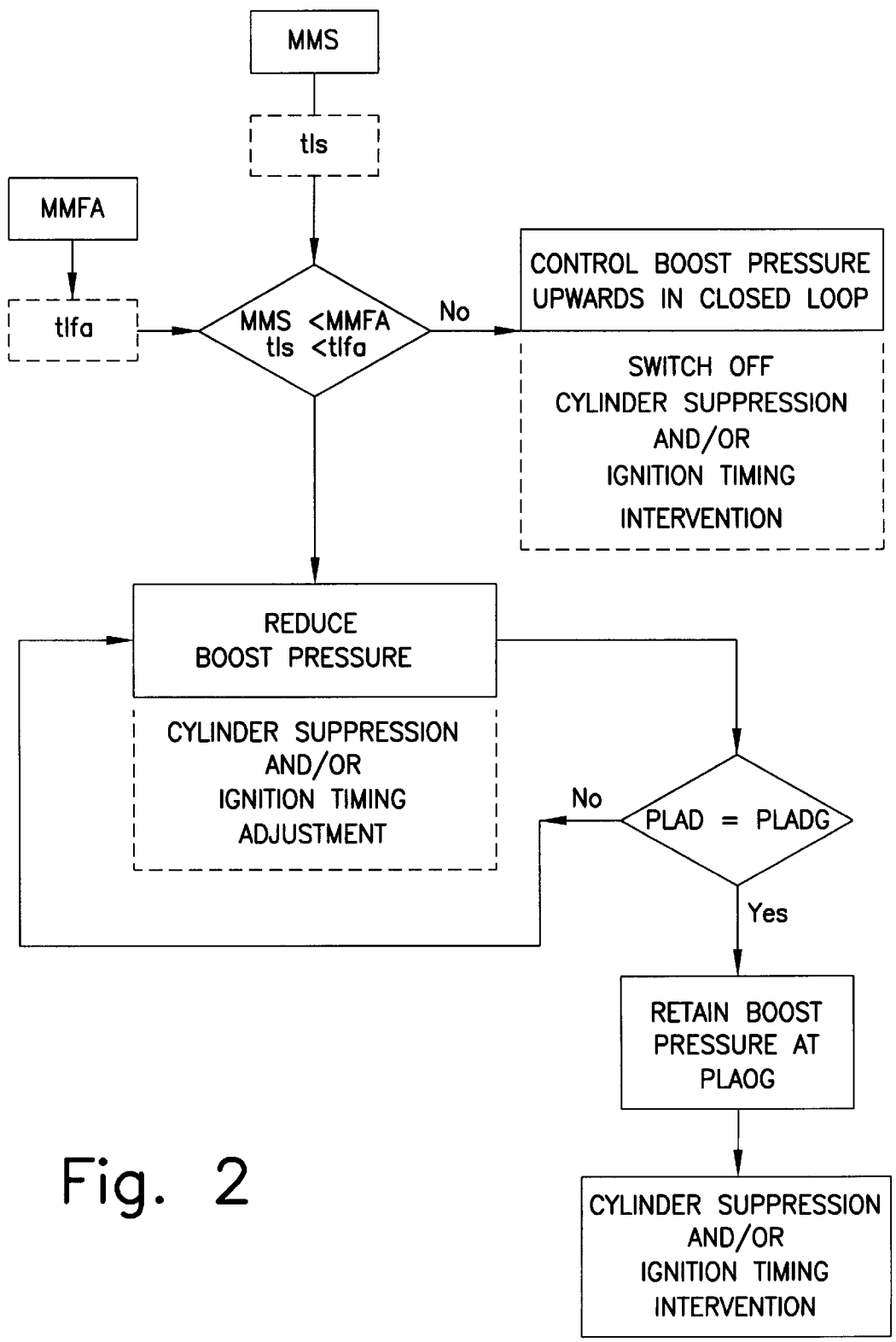
FIG. 2 shows a flow chart of a second exemplary embodiment of the present invention.
Figure 3:
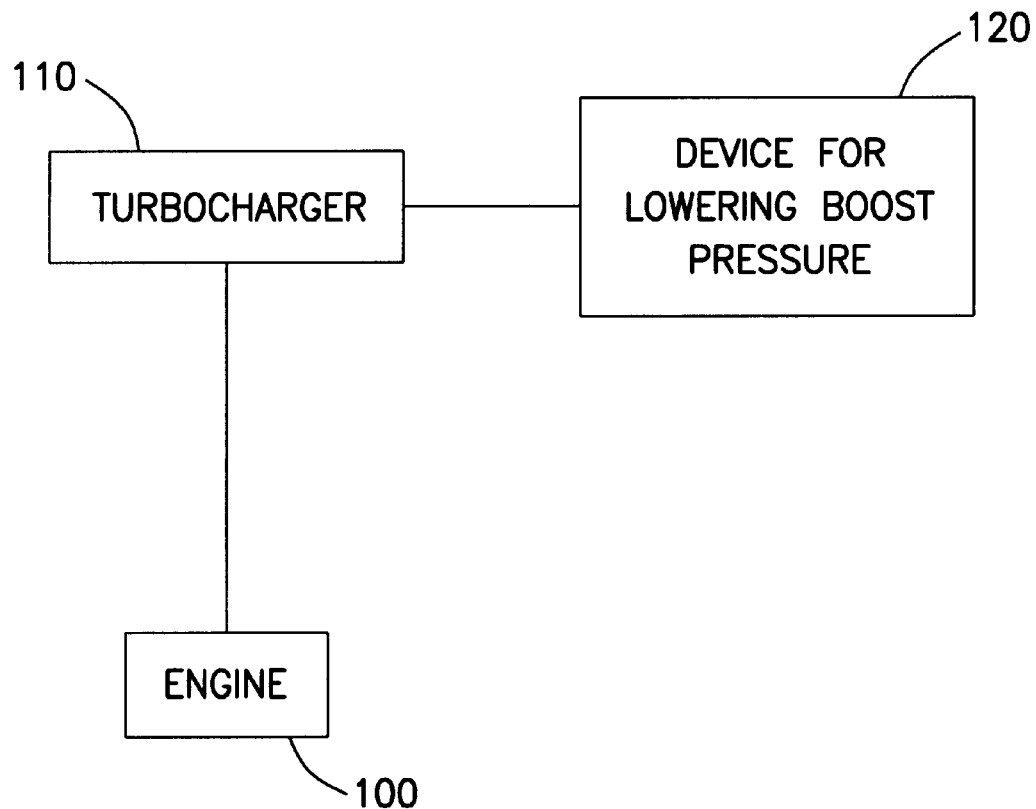
FIG. 3 shows a block diagram of an engine in cooperation with a turbocharger and a device for lowering the boost pressure of the turbocharger in accordance with the present invention.

The present invention will be elucidated in the following on the basis of two exemplary embodiments illustrated in the drawings. FIG. 1 shows a flow chart for controlling the boost pressure of an internal combustion engine; and FIG. 2 a flow chart for controlling the boost pressure in closed loop. FIG. 3 shows a block diagram of an engine 100 in cooperation with a turbocharger 110 and a device for reducing the boost pressure of the turbocharger 120.

The exemplary embodiments relate to a device, which, given an internal combustion engine having a turbocharger, so controls the boost pressure of the turbocharger in open loop or closed loop that the engine torque is reduced to a predetermined setpoint engine torque.

FIG. 1 depicts the functional sequence of a control device, which makes available a setpoint engine torque MMS as a reference variable. This setpoint engine torque MMS can be derived, for example, from a traction control system, which defines a setpoint engine torque required to avoid a tire slip. This setpoint engine torque MMS is compared to an engine torque MMFA that is measured or estimated without intervening in the boost pressure. If this engine torque MMFA is greater than the specified setpoint engine torque MMS, then the boost pressure is lowered to its basic value. The basic value is a fixed value, which corresponds to the smallest possible boost pressure. Since the lowering of the boost pressure and the resultant change in the charge in the cylinders of the internal combustion engine (that is the air mass per cylinder stroke) proceed relatively slowly, a cylinder suppression and/or an ignition timing intervention can be carried out at the same time, in order to satisfy the requirement for the setpoint engine torque during the dynamic engine operation as well. The cylinder suppression and/or the ignition timing intervention remain for as long as the setpoint engine torque is smaller than the engine torque MMFA that is specified without intervening in the boost pressure. However, as soon as the engine torque MMFA that is specified without intervening in the boost pressure is equal to or smaller than the setpoint engine torque MMS, the boost pressure is controlled upwards in closed loop, and the cylinder suppression and/or the ignition timing intervention are switched off.

The reduction in the cylinder charge due to the lowering of the boost pressure results in a drop in the exhaust temperature. Therefore, there is no need to enrich the mixture for cooling purposes. If a cylinder suppression is carried out, an enrichment operation is also not permissible, since otherwise the turbocharger and any existing catalytic converter could be damaged.

Instead of comparing the setpoint engine torque MMS to the engine torque MMFA that is specified without boost pressure intervention, it is likewise possible to compare those engine performance quantities which have a correlation with engine torque. A possible engine performance quantity, for example, is the load tls, which is calculated from the setpoint engine torque and is compared to the load tlfa that is specified without boost pressure intervention.

When working with the previously described control device, the boost pressure is lowered to a fixed minimal value (basic value) when a torque reduction is required. A finer adaptation of the boost pressure to a required setpoint engine torque is achieved by a regulating device, whose method of functioning is described in FIG. 2. As already described above in connection with the control device, a setpoint torque MMS and an engine torque MMFA specified without boost pressure intervention are made available to the regulating device. The two engine torques MMS and MMFA are compared to one another. Instead of the engine torques, corresponding engine performance quantities, e.g., a setpoint load tls and a load tlfa, specified without boost pressure intervention, can also be compared to one another. If the setpoint variable MMS (tls) is smaller than the reference parameter MMFA (tlfa), then the boost pressure is reduced to a value which produces a cylinder charge that corresponds to the required setpoint engine torque MMS. Since it takes a relatively long time to limit the boost pressure, an ignition timing intervention and/or a cylinder suppression are performed to maintain the requirement for the setpoint engine torque during dynamic engine operation. If the boost pressure PLAD has been reduced to its basic value PLADG (PLAD=PLADG), then it is retained at its boost-pressure basic value PLADG, and the torque continues to be reduced, as required, through cylinder suppression and/or ignition timing intervention, so that the setpoint engine torque is not exceeded. As soon as the setpoint variable (setpoint engine torque MMS or setpoint load tls) is greater than or equal to the comparison [reference] variable (engine torque MMFA or load tlfa specified without boost pressure intervention), the boost pressure is controlled upwards in closed loop, and the cylinder suppression and/or ignition timing intervention are switched off.

What is claimed is:

1. A device for lowering a boost pressure of a turbocharger in an internal combustion engine, comprising:

means for defining a setpoint engine torque values the setpoint engine torque value resulting from one of at least one engine influence variable and at least one vehicle influence variable; and means for lowering the boost pressure as a function of the setpoint engine torque value when the setpoint engine torque value is smaller than an engine torque performance quantity specified without boost pressure intervention.

2. The device according to claim 1, wherein the means for lowering the boost pressure lowers the boost pressure to a preset basic level.

3. The device according to claim 1, further comprising a closed loop controller, the closed loop controller controlling the boost pressure when the engine torque performance quantity does not exceed the setpoint engine torque value.

4. The device according to claim 1, wherein the at least one engine influence variable and the at least one vehicle influence variable include at least one of a drive slip, a rotational speed, a velocity limitation, and a gear speed change intervention setting.

5. A method for lowering a boost pressure of a turbocharger in an internal combustion engine, comprising the steps of:

defining a setpoint engine torque value, the setpoint engine torque value resulting from one of at least one engine influence variable and at least one vehicle influence variable; and lowering the boost pressure as a function of the setpoint engine torque value when the setpoint engine torque value is smaller than an engine torque performance quantity specified without boost pressure intervention.

6. The method according to claim 5, wherein the boost pressure is lowered to a preset basic level.

7. The method according to claim 5, further comprising the step of controlling the boost pressure in a closed loop when the engine torque performance quantity specified without boost pressure intervention does not exceed the setpoint engine torque value.

8. The method according to claim 5, wherein the at least one engine influence variable and the at least one vehicle influence variable include at least one of a drive slip, a rotational speed, a velocity limitation, and a gear speed change intervention setting.

* * * * *